April 1, 1958     R. L. EBERLE     2,829,355
WINDING TRANSPOSITION FOR ELECTRICAL APPARATUS
Filed April 5, 1954     2 Sheets-Sheet 1
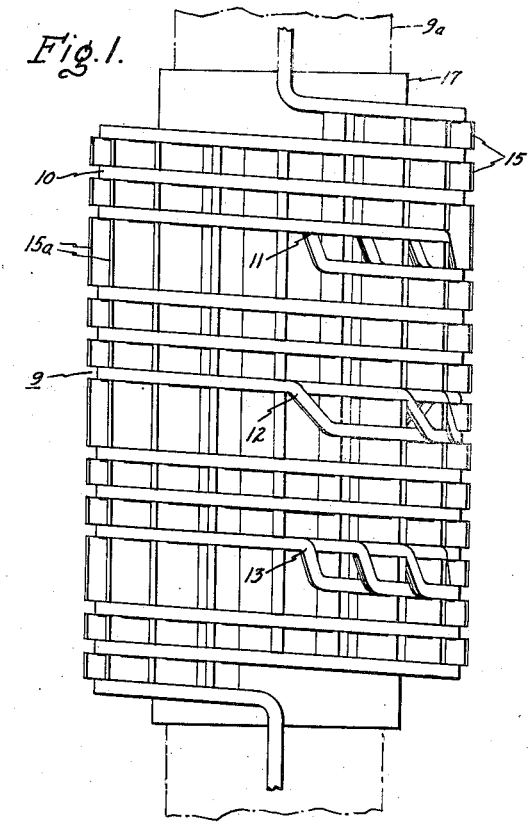
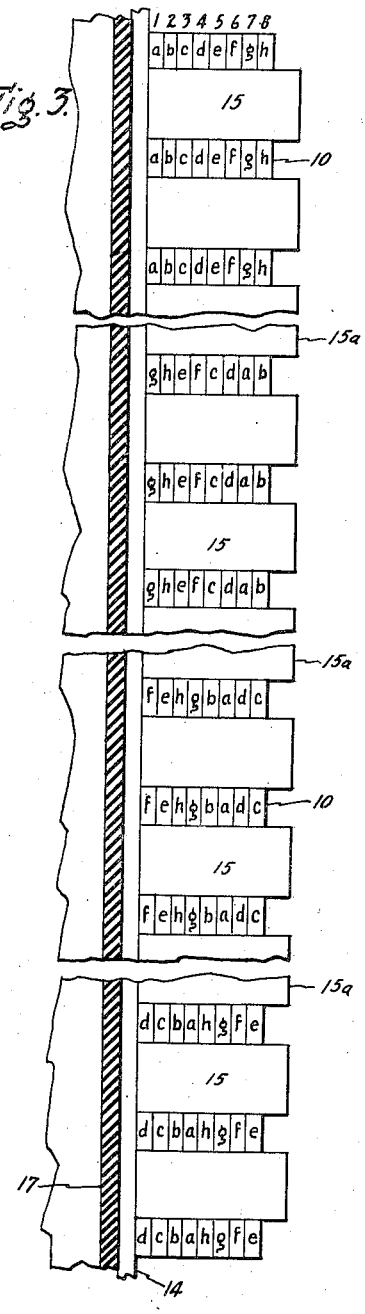
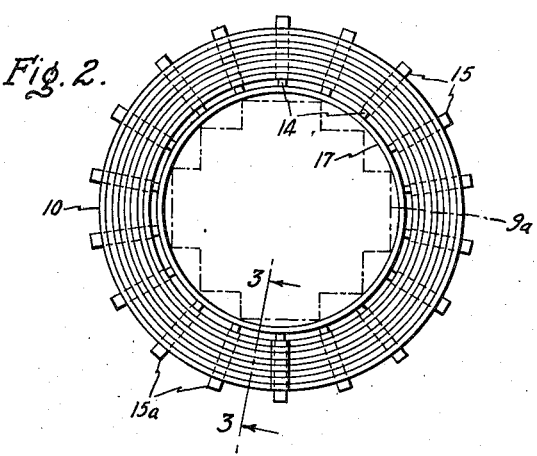
Inventor
Raymond L. Eberle,
by Gilbert P. Tarleton
His Attorney.

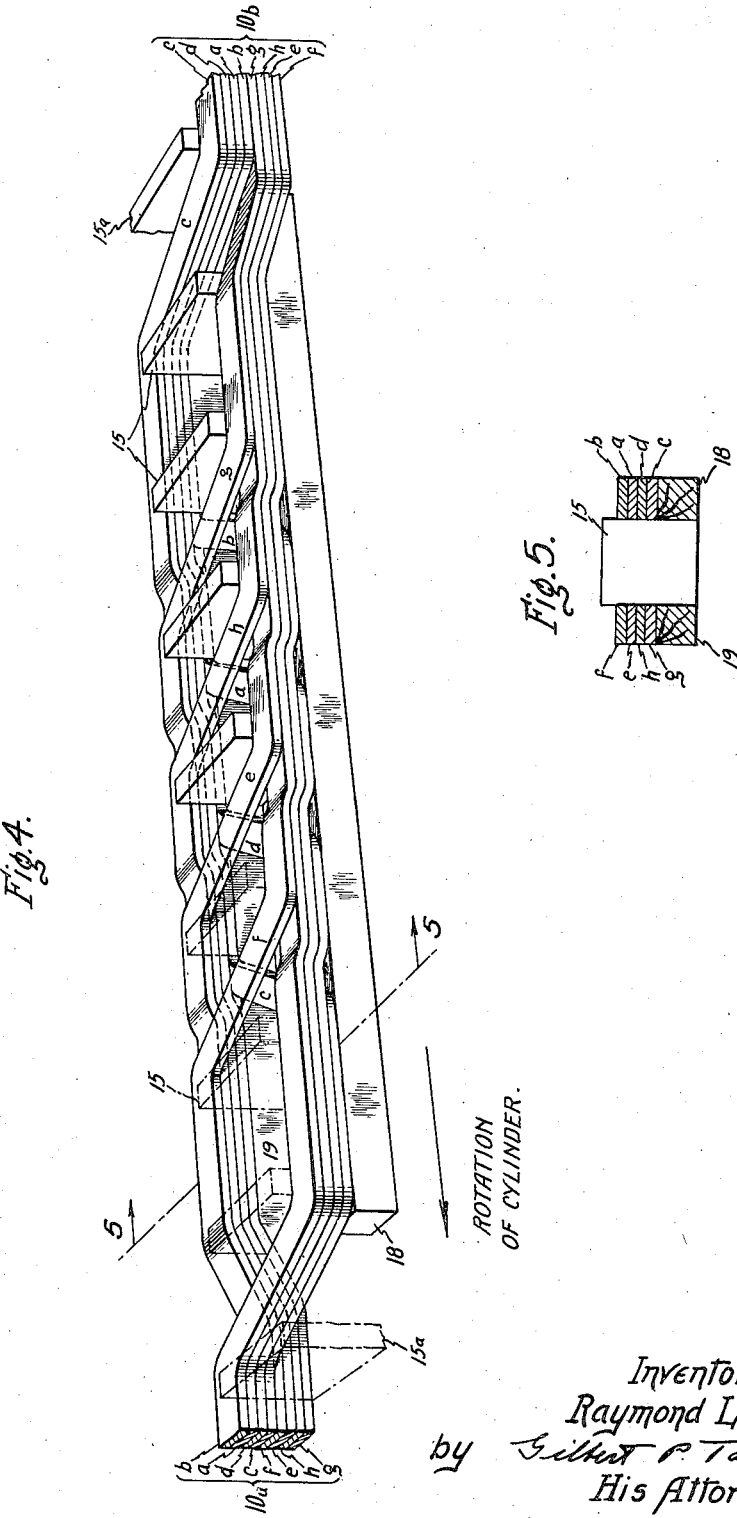

United States Patent Office 2,829,355
Patented Apr. 1, 1958

2,829,355

WINDING TRANSPOSITION FOR ELECTRICAL APPARATUS

Raymond L. Eberle, Pittsfield, Mass., assignor to General Electric Company, a corporation of New York Application April 5, 1954, Serial No. 421,051

5 Claims. (Cl. 336—187)

This invention relates to windings for electrical apparatus and particularly to windings which are laminated or subdivided into a plurality of strands connected in parallel for the purpose of reducing eddy current losses.

In alternating current theory, it is known that as the frequency increases or the size of the conductor increases, there is a tendency for the current in a conductor to concentrate near the surface. This is usually referred to as "skin effect." Analysis of the current distribution in a conductor shows that it can be resolved into two superposed distributions—one conventional like the direct current distribution, and the other circulating within the conductor without getting out of it. This latter is known sometimes as eddy current which does not contribute to the normal current flow and consequently results in a power loss known as eddy current loss.

Heavy current apparatus requires larger conductors than low rated apparatus and ordinarily uses rectangular conductors. As a result, the eddy current losses increase since they vary as the square of the conductor thickness. The thickness is taken as that dimension of the conductor cross-section which is perpendicular to the direction of the leakage flux which exists in electromagnetic apparatus. These high eddy current losses can be reduced by subdividing the conductor into a plurality of insulated strands, connected in parallel. Each strand in a stranded conductor wound about a magnetic core material is subject to the above-mentioned leakage flux. The density of this leakage flux varies in accordance with the distance of the strand from the inside radius of the winding. Consequently, voltages induced in the stranded conductor by the leakage flux are dependent on the position of the strand in the winding.

To compensate for this condition, it is the practice to transpose the strands so that each strand occupies a number of different positions. If the strands are not transposed, or if only a few transpositions are made, the flux linkages are not the same for each strand and different voltages are induced in each strand so that there will be a circulating current from one strand through the parallel connections to another strand. The different strands then do not carry equal currents and in addition to the equivalent D.-C. loss and the eddy loss E within each strand, there results another loss which is known as circulating loss C. By transposing the strands so that the leakage flux linkages of each strand are approximately the same and the length of each strand is the same, then each strand carries approximately the same current. Current distribution conditions are then the same as if all the strands are in series and the eddy loss E may be calculated using the thickness of one strand only instead of the total thickness of the conductor.

In order to obtain an exactly equal division of the current among the strands of the conductor, and consequently an equal distribution of flux linkages, it is necessary, theoretically, to transpose the conductor as often as there are strands. Taking a rectangular conductor, the transpositions should be arranged so that each strand will occupy every position between the two edges of the conductor. However, this would require a multitude of transpositions for a conductor which is of sufficient thickness to divide into a plurality of strands. Various systems of transpositions have been proposed in the past including a so-called Hobart transposition system which transposes each strand into every position as suggested above for ideal conditions. For example, for a twenty-strand conductor, each strand occupies twenty different positions. This requires twenty transpositions and in many coils, it is impractical to make so many transpositions. Therefore, though the Hobart transposition system has no circulating loss, it has found only a limited use.

A more practical transposition system from the standpoint of economy and convenience in winding has been used extensively in transformer windings. This system provides only three individual transpositions per winding regardless of the number of strands. These transpositions are of two kinds, the first and last usually being referred to as special transposition. The system itself is called a standard transposition system. It is considerably more economical to wind than a Hobart transposition system but does not reduce the circulating losses to the same degree.

As an improvement over the standard transposition system, there is disclosed in De Buda application Serial No. 361,011, filed June 11, 1953, now Patent No. 2,710,380, and assigned to the same assignee as the present application, a system using three transpositions which reduces the circulating loss to about $\frac{1}{16}$ that of the standard transposition system. In accordance with the De Buda application an approximately equal distribution of flux linkages is obtained by transposing the conductor strands through three succeeding substantially equally spaced transpositions so that each strand occupies, for substantially one-quarter of the total length of the winding, each of the following four positions in any sequence:

$$(1+x), \left(\frac{m}{2}-x\right), \left(\frac{3m}{4}-x\right), \left(\frac{3m}{4}+1+x\right)$$

where "$x$" is consecutively each integer between $$0 \text{ and } \frac{m}{4}-1$$

and constant for a given strand through all four positions, and "$m$" is equal to the number of strands and is a multiple of four. Two methods of effecting the transpositions, designated "F" and "Q," are disclosed by De Buda. In the "F" method, strands from one conductor channel are axially displaced individually between spacer elements during which they are transposed to their new radial order. As the strands are brought over to the new conductor channel, it is necessary to fill the space caused by removal of the strands with a tapered filler piece.

In accordance with the "Q" transposition, one-quarter of the conductor strands are axially displaced into the new channel at the same time. The "Q" method of transposition is easier to construct than the "F" method. However, it is desirable to incorporate both types of transpositions in a single apparatus.

In fabricating an "F" type transposition, difficulty has been encountered in keeping track of the various strands and in positioning the tapered filler piece. Accordingly, it is an object of the present invention to provide a simple and effective method of effecting transposition of conductor strands from one conductor channel to another.

It is another object of the invention to provide an electrical apparatus in which the conductor strands are transposed by the division of the strands into two substantially equal groups at one portion of the winding, one of the groups being axially displaced from the other and in radial alignment therewith, the transposition of individual strands being effected at a succeeding portion of the winding by axial displacement of the individual strands between the two groups of strands, the groups being then recombined in transposed radial order.

The invention will be described in connection with a winding of the type used on transformers having a concentric construction. However, my system of transpositions may be used in other types of transformer or reactor coils, or for other types of electrical apparatus where a multistrand conductor is subject to a larger leakage field. The only condition is that the leakage flux density must be approximately a linear function of the position of the strands. In a helical coil, this condition is obviously met if the positions of the strands are numbered from the center out.

My invention will be better understood by referring to the accompanying drawings in cooperation with the following description. Fig. 1 of the drawing shows a helical winding such as may be used in a transformer, the conductor forming the winding comprising a plurality of transposed parallel connected strands. Fig. 2 is a plan view of the winding of Fig. 1. Fig. 3 is a view on a longitudinal plane taken radially through the transformer winding, e. g., along line 3—3 of Fig. 2, and is on a larger scale than Fig. 1. Fig. 4 is a perspective view of a portion of the winding in Fig. 1, embodying my improvement and developed in such a manner that the transposition of the winding from one turn to another is illustrated for each strand of the conductor in accordance with the "F" method of De Buda. Fig. 5 is a view taken along the line 5—5 of Fig. 4. The curvature of the winding cylinder is neglected in Fig. 4.

As indicated previously, the common practice has been to transpose a transformer winding three times using a standard transposition system. Using this system the circulating loss may be evaluated approximately by the following formula:

$$C = E \times \left(\frac{m}{13}\right)^2$$

where $C$=circulating loss, $E$=total eddy loss (due to eddy currents within each strand), $m$=number of radial strands. It can be shown mathematically that the transposition system of the De Buda invention, also using three separate transpositions, reduces the circulating loss so that it approximates:

$$C = E \times \left(\frac{m}{50}\right)^2$$

The circulating loss of the Du Buda transposition system is therefore approximately equal to one-sixteenth of the circulating loss of the standard transposition system regardless of the number of strands "$m$." For a small "$m$" the circulating loss of the standard system is small and may be neglected. However, for "$m$" equal to twelve or more as is usually the case in low voltage windings of high kva. units, the circulating loss of the standard system is so high that it cannot be neglected. The De Buda invention, therefore, is particularly applicable when the number of strands "$m$" is equal to or larger than twelve. For purposes of explanation, however, I shall refer to a winding having eight strands since this is more readily illustrated.

Referring to the drawings in Figs. 1, there is shown a helical winding commonly used in transformer constructions having a plurality of turns 10 wound in a helix 9 about a core member 9a. There is illustrated a helix of twelve turns. Each of the winding turns 10 comprises eight separately insulated parallel connected strands lettered "a" to "h" which are transposed at three points 11, 12 and 13 distributed at substantially equal intervals along the winding. The strands "a" to "h" are arranged side by side in a flat layer at right angles to the axis of the helix 9. A winding cylinder 17 surrounds the core member. The turns 10 are spaced from the cylinder 17 by means of a plurality of radially extending key spacers 14 positioned between the cylinder 17 and the winding turns 10. The turns are supported in substantially horizontal planes by spacers 15 which also extend radially from the winding cylinder 17. The spacers 15a located at a point of transposition are of necessity larger. Before transposing, strand "a" is shown as being adjacent the winding cylinder, and strand "h" is the farthest from the cylinder in Figs. 3, 4, 5 and 6.

There is shown in Fig. 3 a radial section cut through the winding illustrating the positions 1 to 8 relative to the winding cylinder 17, into which the strands "a" to "h" may be moved by means of a transposition. By preference to Figs. 4, 5 and 6 the various positions assumed by the strands "a" to "h" may be traced out for the different transpositions used.

The following arrangement of numbers commonly known as a substitution indicates the various positions assumed by each of the eight strands in an eight-strand conductor when transpositions of the type previously mentioned as old and known as special and standard are used.

$$\text{A standard transposition} - S_t - \begin{pmatrix} 1 & 2 & 3 & 4 & 5 & 6 & 7 & 8 \\ 8 & 7 & 6 & 5 & 4 & 3 & 2 & 1 \end{pmatrix}$$
$$(m=8)$$

$$\text{A special transposition} - S_p - \begin{pmatrix} 1 & 2 & 3 & 4 & 5 & 6 & 7 & 8 \\ 5 & 6 & 7 & 8 & 1 & 2 & 3 & 4 \end{pmatrix}$$
$$(m=8)$$

The first line in each of the above symbols represents the relative positions occupied by the eight strands "a" to "h" before the transposition and the second line indicates the positions occupied by the same strands after the transposition. The numbers representing the two positions of the same strand before and after the transposition are arranged in the same vertical column. In other words a standard transposition for "$m$" equal to eight transposes one of the strands from position 1 to position 8, another strand from position 2 into position 7 and so on as indicated. Similarly, a special transposition for "$m$" equal to eight transposes one of the strands from position 1 to position 5, another strand from position 2 to position 6 and so on.

As discussed previously, it has been quite common practice to use these two types of transpositions in a standard transposition system on a transformer winding. This standard system utilizes a special transposition performed at a point on the winding one-quarter of the distance along the conductor, followed by a standard transposition at the midpoint in the conductor and then another special transposition at the three-quarter point on the winding. In an eight-strand conductor, the following arrangement of numbers indicates the positions through which each strand "a" to "h" moves in a standard transposition system:

$$\begin{matrix} & \begin{pmatrix} 1 & 2 & 3 & 4 & 5 & 6 & 7 & 8 \\ S_p & 5 & 6 & 7 & 8 & 1 & 2 & 3 & 4 \\ S_t & 4 & 3 & 2 & 1 & 8 & 7 & 6 & 5 \\ S_p & 8 & 7 & 6 & 5 & 4 & 3 & 2 & 1 \end{pmatrix} \end{matrix}$$

In accordance with the above explanation of the new positions assumed by the various strands after a transposition, strand "a" moves from position 1 into position 5, after the first special transposition, then into position 4 and finally into position 8. Similarly strands "d," "e," and "h" move through the same four positions namely 1, 4, 5 and 8 although in different sequences.

Fig. 4 illustrates the De Buda "F" development (embodying the arrangement of my invention) of part of one turn 10 of the winding showing the transposition of the eight strands "a" to "h" from an upper turn 10a to a lower turn 10b immediately below turn 10a. For eight strands this transposition is described by the substitution:

$$F = \begin{pmatrix} 1 & 2 & 3 & 4 & 5 & 6 & 7 & 8 \\ 4 & 3 & 2 & 1 & 8 & 7 & 6 & 5 \end{pmatrix}$$

which means that one of the eight strands (strands "a" in Fig. 4) moves from position 1 to position 4, strands "b" in Fig. 4 moves from position 2 to position 3 and so on. The movement of the strands from the upper turn 10a to the lower turn 10b during the F transposition may be followed in Fig. 4.

My invention as illustrated in Fig. 4 brings about the same transposition as that achieved by De Buda but it is easier to fabricate and is accomplished in a shorter circumferential winding distance since two strands are transposed between each set of spacers 15. While the transposition illustrated in Fig. 4 is particularly applicable to the De Buda "F" transposition, it is obvious that it may also be used to achieve other transposition.

In Fig. 4 the top half of the strands lettered "b," "a," "d" and "c" are displaced in an axial direction to a succeeding conductor channel and positioned on a filler piece 18 which does not need to be tapered. The displaced portion of the strands are run parallel to the bottom half of the strands lettered "f," "e," "h," and "g" which are brought up to the level of the top half by placing them on a filler piece 19 similar to the filler piece 18. The top strand of the bottom group is then transposed with the bottom strand of the top group between each set of succeeding spacers and the transposition is completed by bringing all the strands together again in the new channel as shown on the right-hand side of Fig. 6. From bottom to top, the order of the strands 1, 2, 3, 4, 5, 6, 7, 8 at the beginning of the transposition has been changed to 4, 3, 2, 1, 8, 7, 6, 5 at the end of the transposition. Although the figure shows only eight strands, the transposition can be used with any even number of strands.

A desirable transposition sequence as illustrated in Fig. 3 is to start with a De Buda "Q" type followed by an "F" type as illustrated in Fig. 6, followed by a final De Buda "Q" type.

My transposition can be effected in the minimum number of spacer spans, does not require a tapered filler piece (which is difficult for a winder to insert properly), and it is simple to keep track of the strands since the topmost and bottom-most in each group are transposed concurrently.

While the invention has been described with reference to a specific embodiment it is obvious that there are variations which will come within the spirit of the invention. Therefore, I aim in the appended claims to cover all such equivalent variations as come within the true spirit and scope of the foregoing disclosure.

What I claim as new and desire to secure by Letters Patent of the United States is:

1. A winding for electrical apparatus comprising a conductor helically wound about a central axis, said conductor being comprised of a plurality of individual continuous insulated strands and having first and second portions with all of said strands radially stacked with respect to said axis and a third portion intermediate said first and second portions and having said strands separated into two groups of radially stacked strands displaced axially with respect to said axis said groups having the same substantially constant radial level with respect to said axis, each of said groups having substantially the same number of strands, the individual strands of said groups being axially displaced between said groups.

2. A winding for electrical apparatus comprising a conductor helically wound about a central axis, said conductor being comprised of a plurality of individual continuous insulated strands and having first and second portions with all of said strands radially stacked with respect to said axis and a third portion intermediate said first and second portions and having said strands separated into two groups of radially stacked strands displaced axially with respect to said axis, said groups having the same substantially constant radial level with respect to said axis, each of said groups having substantially the same number of strands, the individual strands of said groups being axially displaced between said groups, the strands of each of said groups comprising radially adjacent strands of each of said first and second winding portions.

3. A winding for electrical apparatus comprising a conductor helically wound about a central axis, said conductor being comprised of a plurality of individual continuous insulated strands and having first and second portions with all of said strands radially stacked with respect to said axis and a third portion intermediate said first and second portions and having said strands separated into two groups of radially stacked strands axially spaced apart with respect to said axis, each of said groups having substantially the same number of strands, said groups having the same substantially constant radial level with respect to said axis, the individual strands of said groups being axially displaced between said groups with the radially innermost strands of one group being displaced to the radially innermost side of the other group and the radially outermost strands of the other group being displaced to the radially outermost side of said one group, the strands of each of said grounds comprising radially adjacent strands of each of said first and second winding portions.

4. A winding for electrical apparatus comprising a conductor helically wound about a central axis, said conductor being comprised of a plurality of individual insulated continuous strands and having first and second portions with all of said strands radially stacked with respect to said axis and a third portion intermediate said first and second portion, said third portion having said strands separated into two groups of radially stacked strands axially separated with respect to said axis by a plurality of spacers, each of said groups having substantially the same number of strands, said groups having the same substantially constant radial level with respect to said axis, the individual strands of said groups being axially displaced between said groups with at least one strand being displaced between the radially innermost sides of said groups and at least another strand being displaced between the radially outermost sides of said groups between each pair of said spacers, the strands of each of said groups comprising radially adjacent strands of each of said first and second winding portions.

5. A winding for electrical apparatus comprising a conductor helically wound about a central axis, said conductor being comprised of a plurality of individual insulated continuous strands and having first and second portions with all of said strands radially stacked with respect to said axis and a third portion intermediate said first and second portion, said third portion having said strands separated into two groups of radially stacked stands axially separated with respect to said axis by a plurality of spacers, each of said groups having substantially the same number of strands, said groups being held at the same substantially constant radial level with respect to said axis by filler pieces of substantially constant radial width with respect to said axis, the individual strands of said groups being axially displaced between said groups with at least one strand being displaced between the radially innermost sides of said groups and at least another strand being displaced between the radially outermost sides of said groups between each pair of said spacers, the strands of each of said groups comprising radially adjacent strands of each of said first and second winding portions.

References Cited in the file of this patent

UNITED STATES PATENTS

| | | |
|---|---|---|
| 2,249,509 | Welch et al. | July 15, 1941 |
| 2,436,188 | Bilodeau | Feb. 17, 1948 |
| 2,710,380 | De Buda | June 7, 1955 |

FOREIGN PATENTS

| | | |
|---|---|---|
| 431,617 | Great Britain | July 11, 1935 |